UNITED STATES PATENT OFFICE.

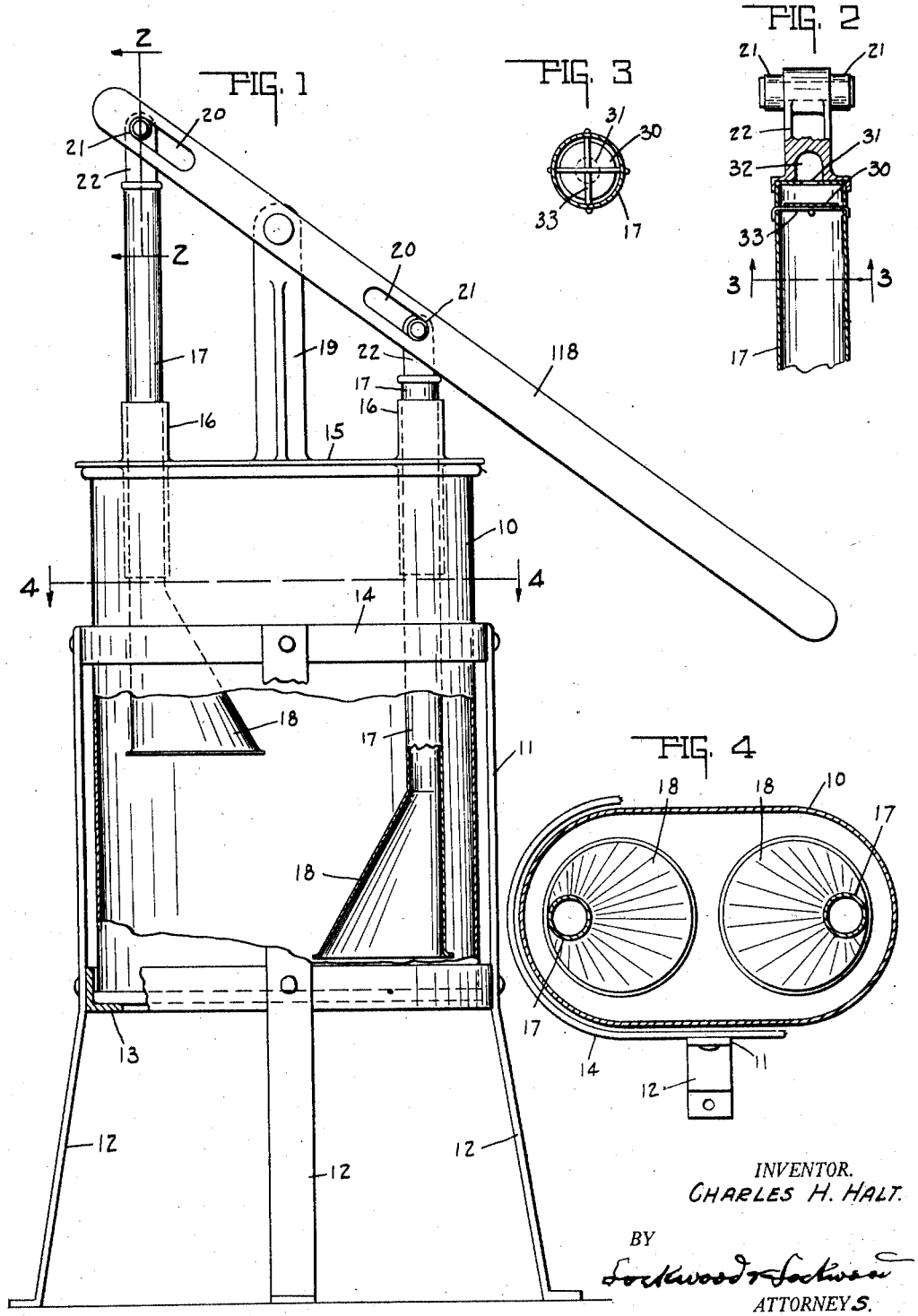

CHARLES H. HALT, OF NEW HAVEN, INDIANA, ASSIGNOR TO NON-EXPLOSIVE APPLIANCE COMPANY, OF FORT WAYNE, INDIANA, A CORPORATION.

BUTTER-MAKING MACHINE.

1,388,639.  Specification of Letters Patent.  Patented Aug. 23, 1921.

Application filed October 18, 1919. Serial No. 331,633.

*To all whom it may concern:*

Be it known that I, CHARLES H. HALT, a citizen of the United States, and a resident of New Haven, county of Allen, and State of Indiana, have invented a certain new and useful Butter-Making Machine; and I do hereby declare that the following is a full, clear, and exact description thereof, reference being had to the accompanying drawings, in which like numerals refer to like parts.

The object of this invention is to provide an improved churn or butter making machine. One feature of the invention consists in employing air filled tubular dashers so that the compressed air therein will coöperate with the structure of the dashers for breaking up the cells of the milk to form the butter.

Another feature of the invention consists in forming the tank, or body of the churn, elongated and mounting the lower end of the dashers eccentrically so that the upper portion or stem thereof will be nearer the ends of the tank or churn body, whereby great throw is obtained from the actuated lever.

The full nature of this invention will be understood from the accompanying drawings and the following description and claims.

In the drawings Figure 1 is a side elevation of the machine with a portion thereof in central vertical section. Fig. 2 is a section on the line 2—2 of Fig. 1. Fig. 3 is a section on the line 3—3 of Fig. 2. Fig. 4 is a section on the line 4—4 of Fig. 1.

In the drawings there is shown a tank or milk receptacle 10 which is removably set in a cage or frame 11 formed of and supported by bars 12. The bars 12 form the legs and are extended up to the top of the frame, as shown herein, and about midway there is secured to them an oblong angle bar 13 on which the bottom of the tank or receptacle 10 rests. At the top of said bars there is an oblong rim bar 14 completing said frame.

The cage or frame 11 is elongated so as to receive the elongated tank or elliptical receptacle 10, in the form shown in Fig. 4. The ends of said tank are curved and the tank has a removable top or lid 15 which has mounted in, and extending through it, tubular guides 16 for the tubes 17 of the dashers 18. These dashers or beaters are vertically reciprocated by the lever 118 which is fulcrumed on the upright 19 that is mounted on the lid 15 and midway between the tubular guides 16. The lever is longitudinally slotted at 20 for the wrist-pins 21 to extend through them. These pins are mounted on bars 22 extending up from the dasher tubes 17, which tubes extend down to the dashers 18, the tubes and dashers being hollow as shown. The lower ends of the dashers are open and substantially circular, as shown in Fig. 4, with a much greater diameter than the tubes 17 with which they are connected, but they are connected with said tubes eccentrically, as shown in Fig. 4, so that the outer portions of the walls of said dashers are in alinement with the tubes 17, whereas the inner portions extend inwardly almost the middle of the tank. Therefore the inner and side walls of said dashers are conical, whereas the outer portion of the walls thereof are vertical and straight. There are two purposes for this construction of the dashers. One purpose is to be able to mount the dasher tubes 17 as far apart as possible so as to give ample vertical throw or movement by the operation of the lever 118. For that reason also the tank is elongated.

Another reason for the peculiar form of the dashers and tubes connected therewith is to successfully act upon the milk by way of beating the same, since the dasher is tapering and the lower part enlarged, to enable the air compressed within the dasher and tube, by virtue of the long vertical stroke or movement thereof, to more effectively churn the milk and break up the cells thereof. Therefore, there are two of these dashers, one in each end of the elongated churn tank or receptacle, and they alternate in their vertical movement by reason of their connection with the lever 118, and the lower ends of the dashers almost approach each other as they pass so that by reason of their form, and the action of the compressed air therein, they more quickly form the butter than plain dasher constructions.

In order to cause the air action in the dashers above alluded to, an automatic valve 30 is located in the upper end of each tube 17, as seen in Figs. 2 and 3, to close the air inlet 31 thereto, and coöperate with the air inlet 32 or opening in the bar 22 to which the handle is pivoted. As shown in Fig. 3 the handle is bifurcated so as to fit astride the bar 22. A wire spider 33 is secured a short distance below the top of the dasher tube 17 to limit the downward movement of the valve 30. As the churn dasher goes down the valve 30 automatically rises and closes the port 31 and prevents the escape of the air in the dasher and dasher tube, whereby the air in the churn dashers is caused to agitate and affect the milk therein. At the beginning of the upward movement of the churn dasher, the valve 30 drops down and permits air to enter the dasher tubes 17. For this purpose the valve 30 is merely a disk of smaller diameter than the tube 17 so that the air can enter around it. Hence as the churn dasher goes up the milk within it freely flows out because of the air pressure in the churn dasher during the upstroke. But during the downward stroke more milk is forced up through the churn dasher and commingles with the air under compression therein. This also forces considerable air, on each downward movement of the dasher, out in the body of the milk in the tank and aerate the milk, and the rapid movement of the air beats the milk so as to facilitate the butter making.

The invention claimed is:

1. A churn including an elongated elliptical tank, a lid therefor, a pair of oppositely located tubular guides in said lid near the ends thereof, dasher members vertically reciprocatory in said guides, dashers secured eccentrically to the lower ends of said members and extending inwardly toward each other at their lower ends, so that one dasher operates at each end of the tank and extends almost to the middle thereof, a handle pivotally connected with the upper ends of said members, and means between said pivotal connections for fulcruming the handle lever between its connections with said dasher members, whereby the dashers will have relatively great vertical movement.

2. A churn including a transversely elongated elliptical tank with a lid therefor, tubular guides through said lid near each end thereof, dasher tubes extending and operating through said guides and having an air port at the upper ends thereof, check valve means in each air port, tubular dashers extending downwardly and secured to the lower ends of said dasher tubes and flaring downwardly toward the middle and sides of said tank, an upright from said lid midway between said tubular guides, a handle lever fulcrumed on said upright and longitudinally slotted adjacent said dasher tubes, and a pin connected with the upper end of each dasher tube extending through its corresponding slot in the lever.

3. A churn including an elongated elliptical tank, a lid therefor, a pair of tubular guides in said lid positioned near the ends thereof and substantially along the major axis, a dasher tube extending and operating through each of said guides and having an air port in the upper end thereof, check valve means in said tube for admitting air to the tank upon the upward stroke of said tube and preventing the escape therefrom on the downward stroke of said tube, tubular dashers extending downwardly and secured to the lower end of the dasher tubes and communicating therewith, said dashers flaring downwardly toward the middle and the sides of said tank to substantially occupy the same, a handle lever pivotally connected with the upper ends of said tubes, and means on said lid positioned between said guides and extending upwardly therefrom for fulcruming the handle between its connections with said dasher tubes, whereby the dashers will have relatively great vertical movement.

In witness whereof, I have hereunto affixed my signature.

CHARLES H. HALT.